United States Patent [19]
Howard et al.

[11] Patent Number: 5,273,729
[45] Date of Patent: Dec. 28, 1993

[54] COMBUSTION METHOD FOR PRODUCING FULLERENES

[75] Inventors: Jack B. Howard, Winchester, Mass.; J. Thomas McKinnon, Boulder, Colo.

[73] Assignee: Massachusetts Institute of Technology, Cambridge, Mass.

[21] Appl. No.: 705,310

[22] Filed: May 24, 1991

[51] Int. Cl.[5] ............................................. C01B 31/00
[52] U.S. Cl. ..................................................... 423/445
[58] Field of Search ............... 423/445, 448, 445 B, 423/DIG. 20

[56] References Cited

U.S. PATENT DOCUMENTS 5,008,098  4/1991  Bernadiner et al. ........ 423/DIG. 20

OTHER PUBLICATIONS

Heath et al., "Lanthanum Complexes of Spheroidal Carbon Shells", *Journ. Am Chem Soc.*, vol. 107 pp. 7779–7780 (1985).

Löffler et al., "Large Ions in Premixed Benzene–Oxygen Flames", Institut für Physikalische Chemie der Technischen Hochschule Darmstadt, (1990).

Christopher James Pope, "Fluxes and Net Reaction Rates of High Molecular Weight Material in a Near-Sooting Benzene-Oxygen Flame", Master's Thesis subm. to MIT Jan. 1988, pp. 80–82.

Bittner et al., "Pre-Particle Chemistry in Soot Formation", from *Particulate Carbon Formation During Combustion*, edited by D. C. Siegla, & G. W. Smith (Plenum Publ. Corp.) 1981.

Zhang et al., "Reactivity of Large Carbon Clusters: Spheroidal Carbon Shells and Their Possible Relevance to the Formation and Morphology of Soot", J. Phys. Chem., 90(4):525.

Kroto et al., "$C_{60}$ Buckminsterfullerene", *Nature*, 318:162, (Nov. 1985).

Gerhardt et al., "The Formation of Polyhedral Carbon Ions in Fuel-Rich Acetylene and Benzene Flames", 22nd Symposium Int'n'l on Combustion/The Combustion Institute, p. 395 (1988).

Harold Kroto, "Space, Stars, $C_{60}$, and Soot", *Science*, 242:1139, (Nov. 1988).

Haufler et al., "Efficient Production of $C_{60}$ (Buckminsterfullerene), $C_{60}H_{36}$, and the Solvated Buckide Ion", *J. Phys. Chem.*, 94(24):8634.

Krätschmer et al., "Solid $C_{60}$: a new form of carbon", *Nature*, 347:354, (Sep. 1990).

Curl et al., "Probing $C_{60}$", *Science*, 242:1017 (Nov. 1988).

Ajie et al., "Characterization of the Soluble All-Carbon Molecules $C_{60}$ and $C_{70}$", J. Phys. Chem., 94(24):8630.

H. W. Kroto, "The stability of the fullerenes $C_n$, with n=24, 28, 32, 36, 50, 60 and 70", *Nature*, 329:529, (Oct. 1987).

Kroto et al., "The formation of quasi-icosahedral spiral shell carbon particles", *Nature*, 331:328, (Jan. 1988).

McKinnon et al., "Combustion Synthesis of Buckminsterfullerene", Article presented at the Western States Section/The Combustion Institute 1991 Spring Meeting (subm. to Combustion & Flame Mar. 1991).

Gerhardt et al., "Polyhedral carbon ions in hydrocarbon flames", Chem. Phys. Ltrs., 137(4):306, (Jun. 1987).

Primary Examiner—Michael Lewis
Assistant Examiner—Stephen G. Kalinchak
Attorney, Agent, or Firm—Choate, Hall & Stewart

[57] ABSTRACT

A method for synthesizing fullerenes in flames is provided. Fullerenes are prepared by burning carbon-containing compounds in a flame and collecting the condensibles. The condensibles contain the desired fullerenes. Fullerene yields can be optimized and fullerene composition can be selectively varied. Fullerene yields and compositions are determined by selectively controlling flame conditions and parameters such as C/O ratio, pressure, temperature, residence time, diluent concentration and gas velocity.

14 Claims, 4 Drawing Sheets

COMBUSTION METHOD FOR PRODUCING FULLERENES

This invention was made with government support under contract Number DE-FG02-84ER-13282 awarded by the Department of Energy. The government has certain rights in the invention.

BACKGROUND OF THE INVENTION

The present invention relates to closed-caged carbon molecules known as Buckminsterfullerenes or fullerenes.

Fullerenes were first reported by Kroto et al. in carbon vapor produced by laser irradiation of graphite ((*Nature* 318, 162-164 (1985)). Fullerene $C_{60}$ is a closed cage carbon structure containing 20 six-membered rings and 12 five-membered rings with the appearance of a soccer ball. There has been a surge of scientific interest in these compounds because they represent a new class of carbon in addition to the two known forms, graphite and diamond.

Fullerenes have many potential applications. The ability to intercalate metal cations into the structure suggests uses as catalysts in industrial processes. The potassium-fullerene $C_{60}$ is a superconductor with a $T_c$ of 11K. The fullerene $C_{60}$ surface is susceptible to chemical reactions such a hydrogenation and fluorination. Fluorinated fullerenes are expected to be good lubricants.

Full development of the utility of fullerenes has been hampered by the inability to produce macroscopic quantities of the material in an inexpensive, efficient process. Recently, $C_{60}$ and $C_{70}$ fullerenes have been produced in macroscopic quantities by graphite vaporization with resistive heating (Krätschmer et al. *Nature* 347, 354-358 (1990)). The formation of fullerenes in sooting flames is an appealing prospect since much data are available for these flames. It has been argued that the hydrogen present in sooting flames would favor the formation of aromatic structures known as polycyclic aromatic hydrocarbons (PAH) over fullerenes. Gerhardt et al. detected all-carbon ions having the same molecular weights as fullerenes in flames (*Chem. Phys. Lett.* 137, 306-310 (1989)). The presence of the neutral species in flames has not yet been definitively established.

SUMMARY OF THE INVENTION

It is the object of the present invention to provide a method for synthesizing fullerenes in flames. It is a further object of the invention to provide a method for optimizing the fuel carbon to fullerene conversion. A further object of the present invention is to provide a means for selectively varying the fullerene composition. By fullerene composition, it is meant the relative yields of fullerenes with different molecular weights and chemical structures.

In one aspect of the present invention, fullerenes are produced by burning carbon-containing compounds in a flame and collecting the condensibles of the flame. The condensibles contain fullerenes.

In another aspect of the invention, fullerenes are prepared by burning carbon-containing compounds in a flame and collecting the condensibles. The flame conditions are chosen such that the fullerene yield is optimized. The condensibles contain fullerenes.

In yet another aspect of the present invention, fullerenes are prepared by burning a carbon-containing compound in a flame and collecting the condensibles. The flame conditions are chosen such that the fullerene composition can be selectively varied.

Condensibles can be collected alone or with soot, where present. The condensibles or soot can be collected from the tail end of the flame, from within the flame or from the inside surface of the burner chamber deposited during combustion. Combustibles can be collected from within the flame by drawing out the combustibles with a probe or pipe and directing the stream through a trap. In larger scale operations, the pipe could be cooled with a water jacket and be provided with means for controlled rates of cooling.

In preferred embodiments, the flame conditions are set by controlling C/O ratio, chamber pressure, residence time in the flame, diluent concentration and gas velocity. Argon is a preferred diluent. An increase in fuel to fullerene conversion is favored by high temperatures, reduced chamber pressures and increased C/O ratio. The fullerene yields and composition vary depending upon the residence time in the flame. However, the effects are not monotonic.

In another embodiment of the present invention, additional energy is supplied to the flame form an external energy source to raise the flame temperature and, thereby, improve fullerene yields. Preferred energy sources include electrical resistance heating, microwave heating, electrical discharge heating and counter-current heating of the input streams. Flame temperature is substantially in the range of 1400K to 3000K.

In other embodiments, additives can be included in the flame. Additives such as halogens can be used to enhance fuel to fullerene conversion by reducing the amount of available hydrogen in the flame. Additives such as alkaline earth metals, alkali metals and iron can be included in the flame to alter the properties of fullerene. In particular, potassium can be added to fullerene to produce superconducting compounds.

In other preferred embodiments, the chamber pressure is sub-atmospheric. The flame can be a sooting flame or a non-sooting flame. The flame can be laminar or turbulent. The fuel is any hydrocarbon, fossil fuel, biomass fuel or products derived from them. The C/O ratio is greater than 0.5 and preferably substantially in the range of 0.72 to 1.07, the diluent concentration is substantially in the range of 0 to 40 mol %, and the gas velocity is substantially in the range of 14 to 75 cm/s, although on an industrial scale, gas velocities could be much higher. The yield of fullerenes is substantially in the range of 0.003 to 7% of the total soot mass. The yield of fullerenes is substantially in the range of 0.002 to 0.24% of the fuel carbon.

In another aspect of the present invention, the chamber pressure is maintained at or at near atmospheric pressure and the flame conditions are controlled to maximize fullerene yields and to obtain the desired fullerene composition.

In order to provide more flexibility, a stable flame can be established with C/O ratio, C/H ratio, pressure, diluent concentration, temperature, residence time and gas velocity adjusted so as to optimize fullerene yield. A fuel is introduced into the flame at a selected post-flame zone where primary flame combustion is essentially complete. The fuel is any carbon-containing compound which yields fullerenes under the conditions established in the stable flame. The condensibles are collected, said condensibles containing fullerenes. In this way conditions under which fullerenes are formed are not dictated by the requirements of flame stability.

The fullerenes can be purified using conventional purification techniques. Fullerenes can be extracted from soot by solvent extraction. The extract can be further purified and the different fullerene fractions separated using liquid chromatography, gas chromatography, supercritical fluid chromatography, sublimation or distillation techniques.

DESCRIPTION OF THE PREFERRED EMBODIMENT

According to the method of the present invention, a benzene fuel was burned in a flame. Soot samples were collected from flames under different ranges of conditions and analyzed for fullerene content and composition using conventional techniques.

Premixed laminar flames of benzene and oxygen with argon diluent were stabilized on a water-cooled burner in a low-pressure chamber equipped with windows and feed-throughs for visual observation, optical diagnostics and probes, and exhausted into a vacuum pump. The flame is stabilized with a flat 70 mm diameter front uniformly displaced from a drilled copper burner through which the feed mixture is delivered. The flame is surrounded by an annular nonsooting flame which provides a thermal shield, giving an approximately one-dimensional core within which temperature and species concentrations vary only with distance, or residence time, from the burner surface. The burner was previously used in mechanistic studies of soot nucleation and growth, and the flames studied are of a type for which considerable data on temperature and chemical composition are available.

Flames were produced under different sets of conditions over the following ranges: burner chamber pressure, 1.60–13.35 kPa; atomic C/O ratio, 0.72–1.07; mol % diluent, 0–30; gas velocity at the burner (298K), 14–75 cm/s. Each flame was maintained for 1.6 to 2.8 hours.

The experimental conditions for the different soot samples are described in Table 1. The sampling techniques for the different soot samples are reported in Table 2. Soot was also collected from the inside surface of the burner chamber after each run. Soot samples were also withdrawn from the flame at a given distance from the burner within the flame and at the tail of the flame using a quartz probe connected to a room-temperature filter, vacuum pump, and gas meter. Using flame temperature and gas composition information, the soot masses and gas volumes collected with the probe in the different flames were found to correspond to soot yields in the range of 0.8 to 12% of the carbon feed.

Figure 1:
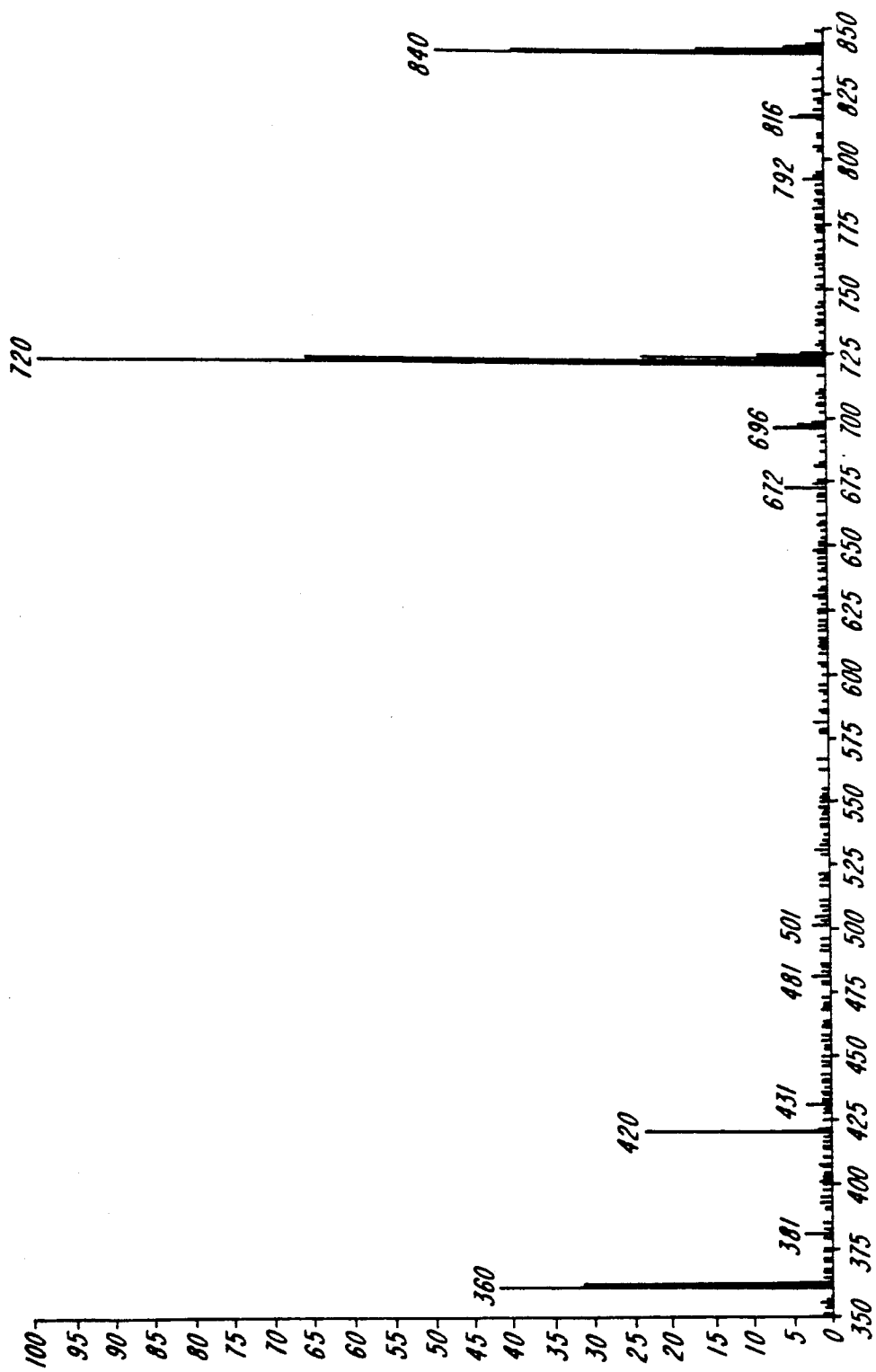
FIG. 1 is an electron impact mass spectrum of a flame soot extract.

The method for analyzing the soot collected in the various experiments was developed as described below. The soot samples were extracted with toluene using an ultrasonic bath at room temperature and filtered. The solution from one of the samples was evaporated to dryness and analyzed with a mass spectrometer. A typical electron impact (EI) mass spectrum is shown in FIG. 1. A direct injection probe heated from 373K to 673K was used to collect the sample. The EI mass spectrum shows peaks with isotopic ratios very close to the expected isotopic ratios for $C_{60}$ and $C_{70}$ and indicated that the soot sample contained a mixture of $C_{60}$ and $C_{70}$ fullerenes with molecular ions at m/e 720 and 840, respectively, and doubly charged molecular ions at m/e 360 and 420, respectively. This conclusion was confirmed by Fourier transform infrared spectroscopy of a KBr pellet sample of the soot extract. A spectrum containing peaks consistent with those previously reported for fullerenes $C_{60}$ and $C_{70}$ was obtained. One of the interesting results of this analysis was that the $C_{70}/C_{60}$ ratio was much larger than that which had been reported for resistively heated graphite samples of fullerene (0.02–0.18). These differences underscore the important effect of processing conditions on the yield and composition of fullerenes.

TABLE 1

Experimental Conditions For Fullerene Synthesis

| Sample No. | $\phi^a$ | C/O | H/C | Pressure (mm Hg) | Cold Gas Velocity (cm/s) | Mol % Ar |
|---|---|---|---|---|---|---|
| 1a | 2.4 | 0.96 | 1.0 | 20 | 50.3 | 10 |
| 1b | 2.4 | 0.96 | 1.0 | 20 | 50.3 | 10 |
| 1c | 2.4 | 0.96 | 1.0 | 20 | 50.3 | 10 |
| 2a | 2.4 | 0.96 | 1.0 | 100 | 14.6 | 38 |
| 2b | 2.4 | 0.96 | 1.0 | 100 | 14.6 | 38 |
| 3a | 2.49 | 0.995 | 1.0 | 20 | 49.1 | 10 |
| 3b | 2.49 | 0.995 | 1.0 | 20 | 49.1 | 10 |
| 4a | 2.49 | 0.995 | 1.0 | 100 | 14.4 | 39 |
| 4b | 2.49 | 0.995 | 1.0 | 100 | 14.4 | 39 |
| 5a | 2.4 | 0.96 | 1.0 | 12 | 75.4 | 0 |
| 5b | 2.4 | 0.96 | 1.0 | 12 | 75.4 | 0 |
| 6a | 2.68 | 1.072 | 1.0 | 40 | 23.4 | 11 |
| 6b | 2.68 | 1.072 | 1.0 | 40 | 23.4 | 11 |
| 7a | $2.90^b$ | 0.930 | 2.24 | 20 | 87.2 | 0 |
| 7b | $2.90^b$ | 0.930 | 2.24 | 20 | 87.2 | 0 |
| 7c | $2.90^b$ | 0.930 | 2.24 | 20 | 87.2 | 0 |
| 7d | $2.90^b$ | 0.930 | 2.24 | 20 | 87.2 | 0 |
| 7e | $2.90^b$ | 0.930 | 2.24 | 20 | 87.2 | 0 |

$^a\phi$ = (actual fuel/oxidant ratio)/(stoichiometric fuel/oxidant ratio)
$^b$additional $H_2$ added

TABLE 2

Sampling of Soot from Fullerene Synthesis

| Sample No. | Sampling$^a$ Location | Soot Mass (mg) | Soot Volume Fraction | Soot, % of Total Carbon | $C_7H_8$ Extract, % of Soot |
|---|---|---|---|---|---|
| 1a | A(2.11) | 108.21 | Not Meas. | — | 4.769 |
| 1b | B | 823.02 | | | 3.655 |
| 1c | C | 522.66 | | | 3.069 |
| 2a | A(1.45) | 1,313.79 | $2.60 \times 10^{-7}$ | 8.4 | 0.687 |
| 2b | B,C | 4,630.48 | | | 0.254 |
| 3a | A(8.0) | 445.1 | $2.68 \times 10^{-8}$ | 3.6 | 5.136 |
| 3b | B,C | 3,848.06 | | | 9.421 |
| 4a | A(1.2) | 1,060.41 | $3.69 \times 10^{-7}$ | 11.9 | 3.038 |
| 4b | B,C | 6,016.42 | | | 1.066 |
| 5a | A(3.69) | 73.57 | $3.56 \times 10^{-9}$ | 0.75 | 7.122 |
| 5b | B,C | 855.18 | | | 1.431 |
| 6a | A(2.15) | 515.39 | $1.15 \times 10^{-7}$ | 7.3 | 9.181 |
| 6b | B,C | 10,905.49 | | | |
| 7a | A(5.01) | 325.45 | $2.59 \times 10^{-8}$ | 4.6 | 0.774/ 0.977$^b$ |
| 7b | B | 624.04 | | | 1.763 |
| 7c | D(4) | — | | | |
| 7d | E | — | | | |

TABLE 2-continued

Sampling of Soot from Fullerene Synthesis

| Sample No. | Sampling[a] Location | Soot Mass (mg) | Soot Volume Fraction | Soot, % of Total Carbon | $C_7H_8$ Extract, % of Soot |
|---|---|---|---|---|---|
| 7e | C | 175.21 | | | 2.751 |

Figure 2:
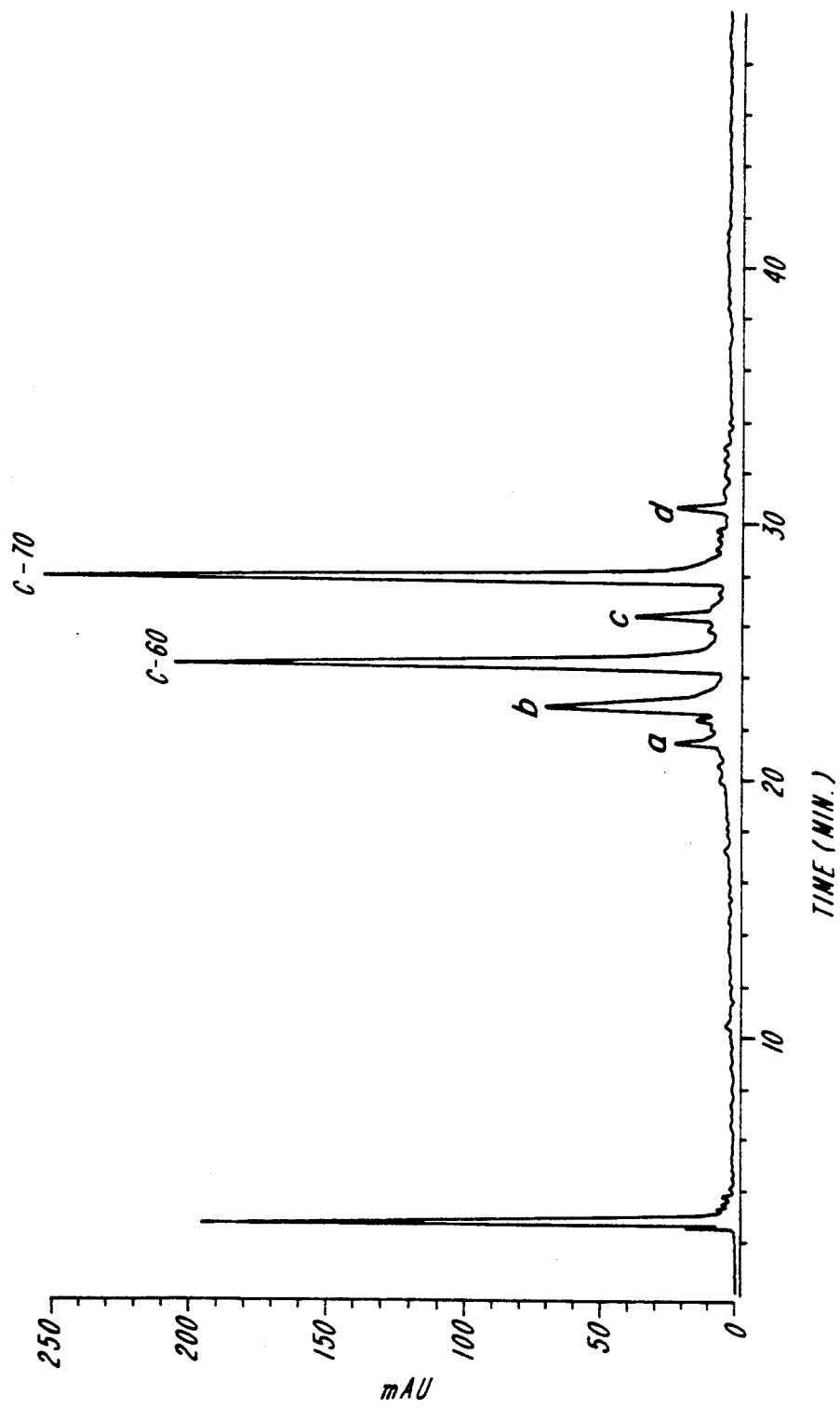
FIG. 2 is a high performance liquid chromatogram of a flame soot extract.

[a] A = probe (cm from burner); B = burner chamber top; c = burner chamber walls; D = Cu block in flame (cm); E = outside lower 2 cm of probe
[b] second determination The toluene extracts of the soot samples were fractionated with a high performance liquid chromatograph (HPLC) coupled to a spectrophotometric diode-array detector (DAD). A separation scheme proven effective for large PAH was used. A typical HPLC chromatogram for the toluene extracts is shown in FIG. 2. Separation was effected using an octadecylsily-bonded silica column with a methanol-dichloromethane mobile phase. The absorbance axis gives the sum of absorbance over the 236-500 nm wavelength interval. The broadband DAD resonance shown is roughly proportional to mass for PAH. The peaks labeled C-60 and C-70 gave ultraviolet (UV) spectra closely matching those published for $C_{60}$ and $C_{70}$ fullerenes, respectively. The peaks labeled a, b, c and d gave UV spectra that could not be traced to any known PAH, but appeared to be structurally related to the fullerenes. One or more of these satellite peaks was commonly present in chromatograms of soot extracts containing fullerenes.

Figure 3:
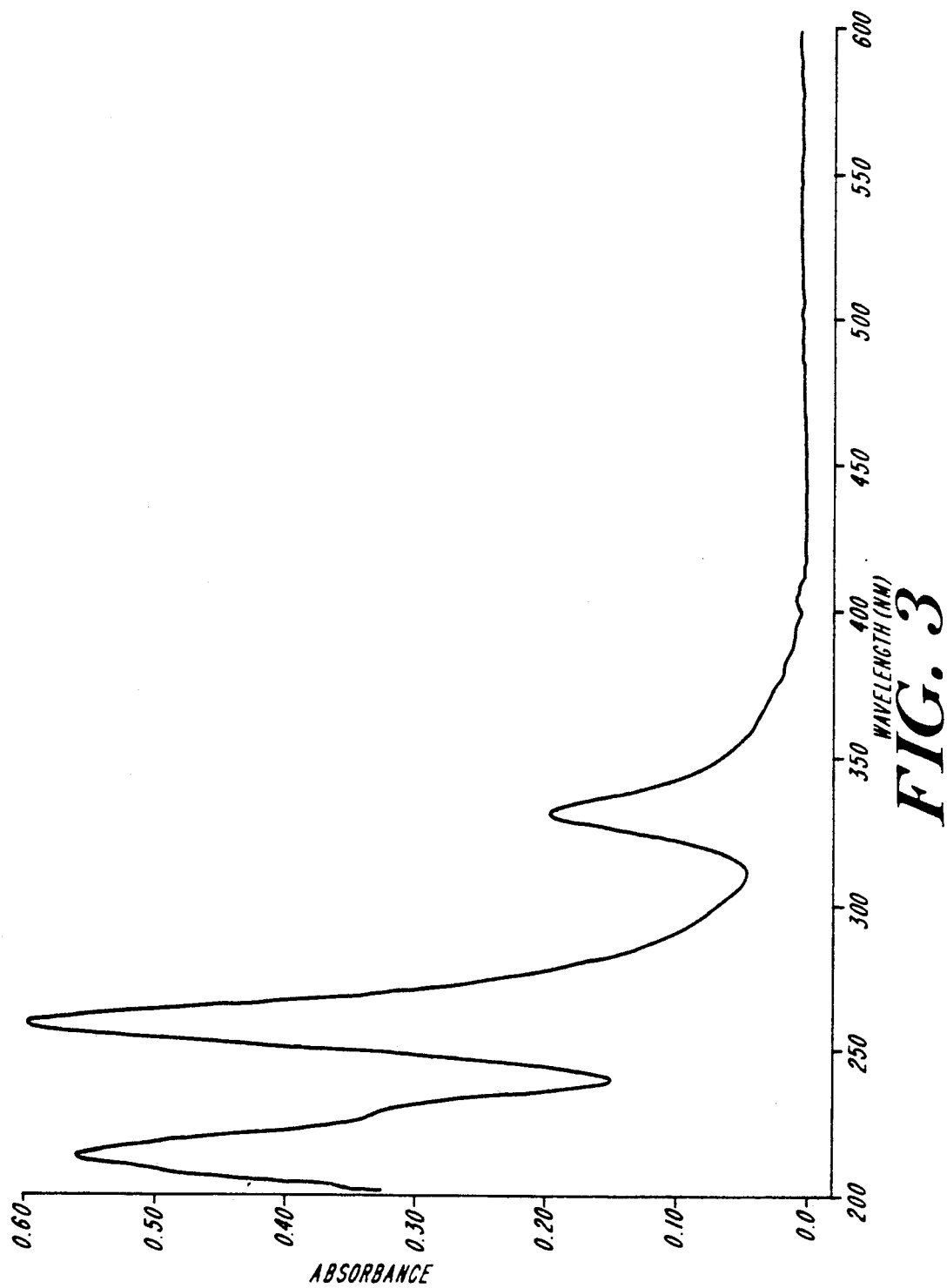
FIG. 3 is an ultraviolet-visible spectrum of $C_{60}$ fullerene.
Figure 4:
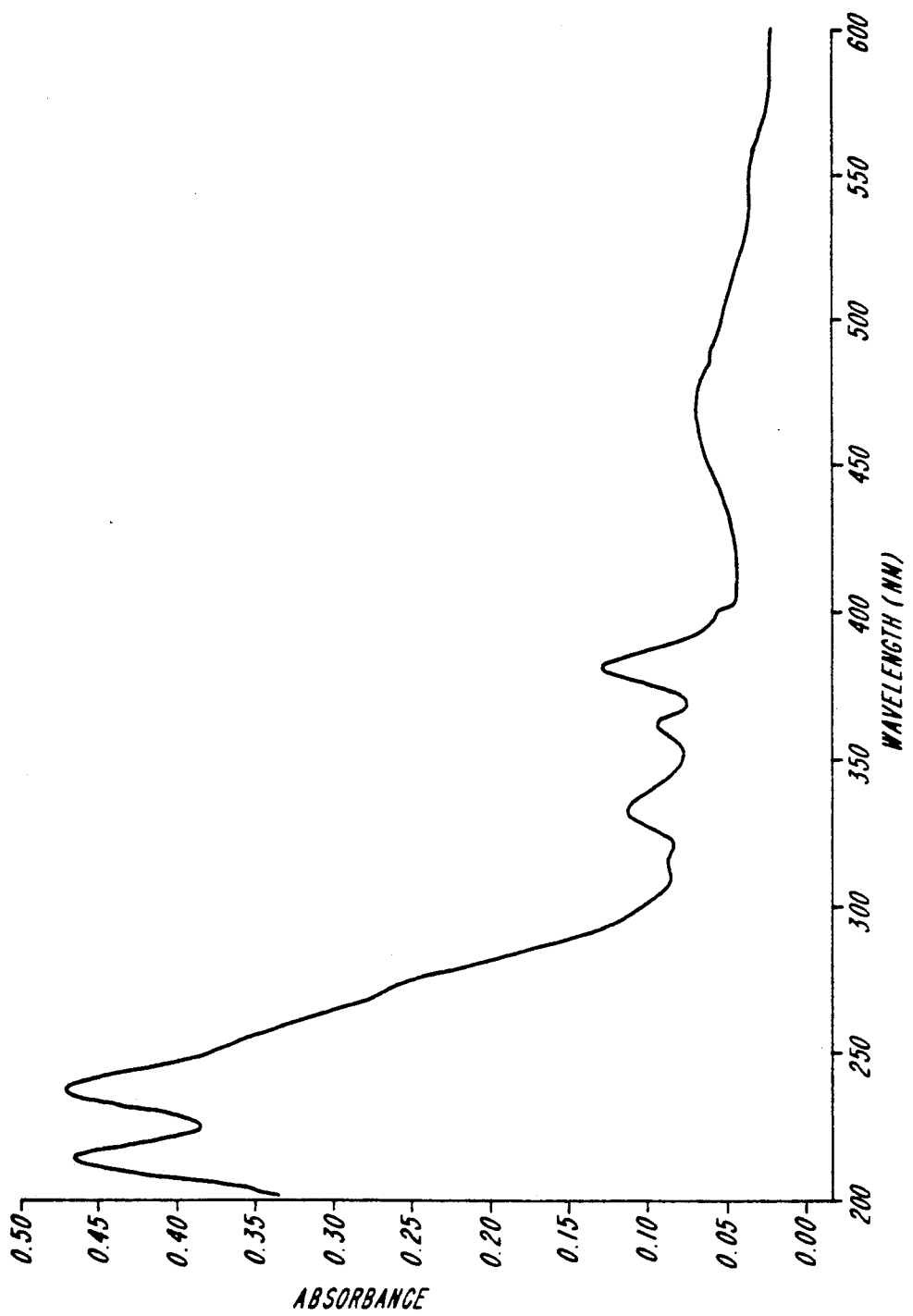
FIG. 4 is an ultraviolet-visible spectrum of $C_{70}$ fullerene.

In order to obtain broadband ultraviolet-visible (UV-Vis) spectra, solutions from HPLC fractionation of the soot extracts were concentrated by evaporation and the HPLC mobile phase was replaced with spectral grade decalin. The UV-Vis spectra of the C-60 and C-70 peaks were acquired using a spectrophotometer. The spectra shown in FIGS. 3 and 4 are virtually identical to those reported by Ajie et al. for $C_{60}$ and $C_{70}$ fullerenes, respectively (*J. Phys. Chem.* 94, 8630-8633 (1990)).

Mass spectra of the HPLC fractions thought to be $C_{60}$ and $C_{70}$ were acquired using the equipment and techniques mentioned above. The C-60 peak gave a mass spectrum with all the reported features of $C_{60}$ fullerene. It gave a molecular base peak at m/e 720, showed no loss of hydrogen and had a significant doubly charged molecular ion at m/e 360. Similarly, the C-70 peak gave a mass spectrum with features closely matching those of published spectra for $C_{70}$ and contained a molecular base peak at m/e 840 and a doubly charged molecular ion peak at m/e 420. Therefore, the identities of the HPLC peaks suggested by UV-Vis spectra were confirmed by mass spectra. The HPLC method, including gravimetric calibration of the $C_{60}$ and $C_{70}$ peaks, was then used to analyze the toluene extracts from all soot samples.

The $C_{60}+C_{70}$ yields and $C_{70}/C_{60}$ ratios for the various samples are reported in Table 3. The yield of $C_{60}+C_{70}$ produced under the different flame conditions is in the range of 0.003-7% of the soot mass, which can be compared to 1-14% from graphite vaporization. The largest yield corresponding to 0.24% of the fuel carbon or 2.2 gram of $C_{60}+C_{70}$ per kilogram benzene burned was obtained at a pressure of 20 torr, a C/O ratio of 0.995 with 10% argon and a gas velocity at the burner of 49.1 cm/s at 298K. The flame temperature was approximately 1800K. Given these results and the ability to scale up combustion reactors, flame synthesis is an attractive alternative method for the production of fullerenes.

The relationship between flame conditions and final fullerene yields and composition was complicated. Factors affecting the final composition of the soot were identified as the C/O ratio, chamber pressure, diluent concentration, residence time in flame, flame temperature and gas velocity. Generally, it was observed that increased temperature, lower pressures and higher C/O ratios favored increased $C_{60}+C_{70}$ yields. However, the effects were not monotonic.

For example, the results reported in Table 3 suggested that lowering pressure improved $C_{60}+C_{70}$ yields. However, there was a lower limit to reducing pressure beyond which the yield decreased. Lower pressures reduce the mass flow rate through the flame, thereby lowering the temperature which negatively affects the fullerene yield.

Likewise, any hydrocarbon could in theory be used as a fuel source for fullerene synthesis. However, some fuels burn hotter than others and some have higher C/H ratios. The choice of fuel may well affect fullerene yield and composition.

TABLE 3

Fullerene Yield and Composition

| Sample Number | Mass of Toluene Extract (mg) | Mass, μg | | Σ μg | Yield of $C_{60} + C_{70}$ | | | $C_{70}/C_{60}$ Molar Ratio | Soot, % of Carbon Fed | $C_{60} + C_{70}$ Conc. in flame (g/cm³) |
|---|---|---|---|---|---|---|---|---|---|---|
| | | $C_{60}$ | $C_{70}$ | $C_{60} + C_{70}$ | % of Toluene Extract | % of Soot | % of Carbon Fed | | | |
| 1a | 5.16 | 2,394.40 | 3,498.64 | 5,893.04 | 114.2 | 5.446 | — | 1.252 | — | — |
| 1b | 30.08 | 1,286.97 | 3,050.34 | 4,337.31 | 14.42 | 0.527 | — | 2.032 | | |
| 1c | 16.04 | 753.54 | 2,198.38 | 2,951.92 | 18.4 | 0.565 | — | 2.501 | | |
| 2a | 9.02 | 116.84 | 321.26 | 438.10 | 4.86 | 0.0333 | 0.0028 | 2.357 | 8.4 | $1.56 \times 10^{-10}$ |
| 2b | 11.78 | 78.72 | 287.52 | 366.24 | 3.11 | 0.0079 | — | 3.131 | | |
| 3a | 22.86 | 14,819.64 | 14,848.24 | 29,667.88 | 129.80 | 6.665 | 0.240 | 0.8588 | 3.6 | $3.22 \times 10^{-9}$ |
| 3b | 362.52 | 99,591.78 | 174,749.46 | 274,341.24 | 75.68 | 7.129 | — | 1.504 | | |
| 4a | 32.22 | 40.60 | 268.87 | 309.47 | 0.96 | 0.0292 | 0.0035 | 5.676 | 11.9 | $1.94 \times 10^{-10}$ |
| 4b | 64.16 | 95.06 | 61.74 | 156.80 | 0.24 | 0.0026 | — | 0.5567 | | |
| 5a | 5.24 | 504.72 | 697.81 | 1,202.53 | 22.95 | 1.634 | 0.0123 | 1.185 | 0.75 | $1.05 \times 10^{-10}$ |
| 5b | 12.24 | 45.59 | 43.96 | 89.55 | 0.73 | 0.0105 | — | 0.8265 | | |
| 6a | 47.32 | 119.84 | 36.96 | 156.80 | 0.33 | 0.0304 | 0.0022 | 0.2644 | 7.3 | $6.29 \times 10^{-11}$ |
| 6b | 42.62 | 127.31 | 402.52 | 529.83 | 1.24 | 0.0092 | — | 2.710 | | |
| 7a | 2.52/3.17[a] | 152.38 | 262.92 | 415.30 | 16.48 | 0.128 | 0.0059 | 1.479 | 4.6 | $5.97 \times 10^{-11}$ |
| 7b | 11.00 | 795.18 | 2,618.58 | 3,413.76 | 31.03 | 0.547 | — | 2.823 | | |
| 7c | | | | | | | | | | |
| 7d | | | | | | | | | | |

TABLE 3-continued

| | | | | Fullerene Yield and Composition | | | | | |
|---|---|---|---|---|---|---|---|---|---|
| | Mass of | | | | Yield of $C_{60} + C_{70}$ | | | Soot, | $C_{60} + C_{70}$ |
| Sample Number | Toluene Extract (mg) | Mass, μg | | Σ μg | % of Toluene | % of | % of Carbon | $C_{70}/C_{60}$ Molar | % of Carbon | Conc. in flame |
| | | $C_{60}$ | $C_{70}$ | $C_{60} + C_{70}$ | Extract | Soot | Fed | Ratio | Fed | (g/cm³) |
| 7c | 4.82 | 475.00 | 1,751.90 | 2,226.90 | 46.20 | 1.271 | — | 3.161 | | |

*second determination

Samples were collected at different places in the burner chamber which represent different residence times in the flame. Different fullerene yields and compositions were observed for samples with different residence times. It is possible to generate a fullerene conversion profile as a function of residence time in the flame and selectively collect the condensibles at the time corresponding to the optimized yield and composition of the desired fullerene.

The realization that these parameters are important to the final fullerene yields and composition and that the competing effects of the various processing parameters must be taken into consideration when maximizing fullerene production is critical to the successful synthesis of fullerenes.

The $C_{70}/C_{60}$ ratio for the different flame conditions was in the range 0.26–5.7, which can be compared to 0.02–0.18 for graphite vaporization. The ratio was 0.86 for the above conditions of maximum $C_{60} + C_{70}$ yield. The much larger yields of $C_{70}$ and the ability to control the $C_{70}/C_{60}$ ratio by setting the flame conditions are significant differences from the graphite vaporization technique.

The largest yields of fullerenes did not occur in the most heavily sooting flames. Also, the fullerene yield increased with increasing temperature or decreasing pressure under conditions where the same changes resulted in lower soot yields. These trends in data reflect substantial differences between the formation and destruction reactions of fullerenes as compared to those of soot.

What is claimed is:

1. A method of producing fullerenes comprising the steps of:
   burning a carbon-containing fuel in a flame under conditions effective to produce macroscopic amounts of fullerenes;
   introducing additives into the flame;
   collecting the resulting condensibles, the condensibles containing fullerenes; and
   recovering the fullerenes from the condensibles.

2. A method for producing fullerenes, comprising the steps of:
   establishing a flame in a chamber under conditions effective to produce macroscopic amounts of fullerenes, the chamber being at a pressure less than atmospheric and the flame being a sooting flame and sustained by an aromatic carbon-containing fuel and an oxidant;
   introducing additives into the flame;
   collecting the resulting condensibles, the condensibles containing fullerenes; and
   recovering the fullerenes from the condensibles.

3. The method of claim 1 or claim 2 wherein the additives are halogens.

4. A method for producing fullerenes comprising the steps of:
   burning a carbon-containing fuel in a flame under conditions effective to produce macroscopic amounts of fullerenes;
   collecting the resulting condensibles from within the flame by drawing the condensibles from the flame through a probe and collecting the condensibles in a trap, the condensibles containing fullerenes; and
   recovering the fullerenes from the condensibles.

5. A method for producing fullerenes, comprising the steps of:
   establishing a flame in a chamber under conditions effective to produce macroscopic amounts of fullerenes, the chamber being at a pressure less than atmospheric and the flame being a sooting flame and sustained by an aromatic carbon-containing fuel and an oxidant;
   collecting the resulting condensibles from within the flame by drawing the condensibles from the flame through a probe and collecting the condensibles in a trap, the condensibles containing fullerenes; and
   recovering the fullerenes from the condensibles.

6. A method for producing fullerenes comprising the steps of:
   burning a carbon-containing fuel in a flame under conditions effective to produce macroscopic amounts of fullerenes;
   collecting the resulting condensibles from within the flame by injecting a quenching agent into the flame, whereby the condensibles condense and are carried in the flame to a collecting point, the condensibles containing fullerenes; and
   recovering the fullerenes from the condensibles.

7. A method for producing fullerenes, comprising the steps of:
   establishing a flame in a chamber maintained under conditions effective to produce macroscopic amounts of fullerenes, the chamber being at a pressure less than atmospheric and the flame being a sooting flame and sustained by an aromatic carbon-containing fuel and an oxidant;
   collecting the resulting condensibles from within the flame by injecting a quenching agent into the flame, whereby the condensibles condense and are carried in the flame to a collecting point, the condensibles containing fullerenes; and
   recovering the fullerenes from the condensibles.

8. A method for producing fullerenes comprising the steps of:
   burning a carbon-containing fuel in a flame under flame conditions to produce macroscopic amounts of fullerene;
   collecting the resulting condensibles, the condensibles containing fullerenes; and
   recovering the fullerenes from the condensibles, wherein said flame conditions are controlled so that the condensibles comprise fullerene $C_{60}$ and fullerene $C_{70}$ and wherein the ratio of fullerene $C_{70}$ to fullerene $C_{60}$ is substantially in the range of 0.26 to 5.7.

9. A method for producing fullerenes, comprising the steps of:

establishing a flame and a chamber under conditions effective to produce macroscopic amounts of fullerenes, the chamber at a pressure less than atmospheric and the flame being a sooting flame and sustained by an aromatic carbon-containing fuel and an oxidant collecting the resulting condensibles, the condensibles containing fullerenes; and recovering the fullerenes from the condensibles, wherein said flame conditions are controlled so that the condensibles comprise fullerene $C_{60}$ and fullerene $C_{70}$ and wherein the ratio of fullerene $C_{70}$ to fullerene $C_{60}$ is substantially in the range of 0.26 to 5.7.

10. A method for producing fullerenes comprising the steps of:

burning a carbon-containing fuel in a flame under flame conditions effective to produce macroscopic amounts of fullerenes;

collecting the resulting condensibles, the condensibles containing fullerenes; and recovering the fullerenes from the condensibles, wherein the flame conditions effective to produce macroscopic amounts of fullerenes are controlled by one or more of the parameters selected from the group consisting of a carbon to oxygen ratio of the carbon fuel and an added oxidant wherein the carbon to oxygen ratio of the fuel and oxidant is greater than 0.5; and a concentration of a diluent added to the fuel.

11. A method for producing fullerenes comprising the steps of:

establishing a flame in a chamber under conditions effective to produce macroscopic amounts of fullerenes, the chamber being at a pressure less than atmospheric and the flame being a sooting flame and sustained by an aromatic carbon-containing fuel and an oxidant, the carbon to oxygen ratio of the fuel and oxidant being greater than 0.5;

collecting the condensibles, the condensibles containing fullerene; and recovering the fullerenes from the condensibles.

12. Method for producing fullerenes comprising the steps of:

burning a carbon-containing fuel with an oxygen containing oxidant, the carbon to oxygen ratio of the fuel and oxidant being greater than 0.5, in a flame under flame conditions effective to produce macroscopic amounts of fullerenes;

collecting the resulting condensibles, the condensibles containing fullerenes; and recovering the fullerenes from the condensibles.

13. The method of claim 10 or claim 11 or claim 12 wherein the carbon to oxygen ratio is substantially in the range of 0.72 to 1.07.

14. The method of claim 6 or claim 7 wherein the quenching agent is a chemical quenching agent.

* * * * *

UNITED STATES PATENT AND TRADEMARK OFFICE
CERTIFICATE OF CORRECTION

PATENT NO. : 5,273,729
DATED : December 28, 1993
INVENTOR(S) : Jack B. Howard, et al It is certified that error appears in the above-indentified patent and that said Letters Patent is hereby corrected as shown below:

Column 1, line 29: please delete "a" and insert therefor -- as --;

Column 2, line 26: please delete "form" and insert therefor -- from --;

Column 5, line 18: please delete "octadecylsily" and insert therefor -- octadecylsilyl --; and Column 10, line 14: please delete "fullerene" and insert therefor -- fullerenes --.

Signed and Sealed this

Fifth Day of July, 1994

Attest:

BRUCE LEHMAN

Attesting Officer    Commissioner of Patents and Trademarks